UNITED STATES PATENT OFFICE.

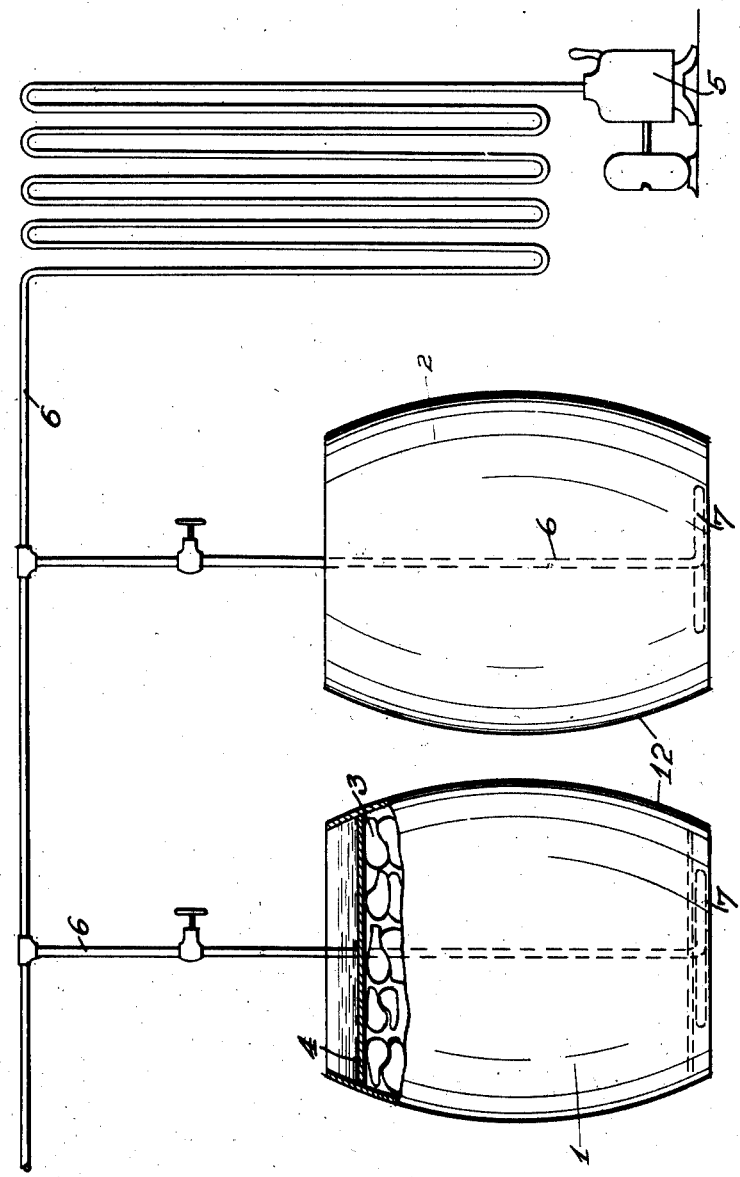

JOHN W. ALLEN, OF SOUTH OMAHA, NEBRASKA.

PROCESS OF PREPARING MALTED FOOD PRODUCTS.

1,385,352.   Specification of Letters Patent.   Patented July 26, 1921.

Application filed November 6, 1919. Serial No. 336,024.

*To all whom it may concern:*

Be it known that I, JOHN W. ALLEN, a citizen of the United States, and a resident of South Omaha, in the county of Douglas and State of Nebraska, have invented a new and useful Improvement in Processes of Preparing Malted Food Products, of which the following is a full, clear, and exact description.

My invention relates to improvements in the process of preparing malted food products, and it consists in the steps hereinafter set forth.

An object of my invention is to provide a process by means of which malted food products may be prepared, the invention lying primarily in the curing and seasoning of meats, but being applicable to other food products, such as vegetables, meat extracts, etc., said process being economical in that it obviates the handling, rehandling, and overhauling to which malted food products made by the ordinary processes are subject.

A further object of my invention is to provide an economical process of preparing malted foods in which a malt flavor is imparted to the food products during the curing of the same and not subsequently, as in ordinary processes, thereby saving time, as well as labor.

A further object of my invention is to provide a process of preparing malted food products in which the malting agent is used in concentrated form, thereby eliminating the use of large quantities of malt in which the foods are packed to impart the malted flavor.

Other objects and advantages will appear in the following specification, and the novel features of the invention will be particularly pointed out in the appended claims.

My invention is illustrated in the accompanying drawing, forming part of this application, which is a diagrammatical view showing one form of apparatus that may be used in carrying out the process, although it will be understood that the particular form of apparatus set forth is not essential to the successful working of the process.

In carrying out the process, I make use of a malt extract which is prepared in the following manner: A quantity of malt is cooked in water in a steam jacketed kettle, and from which all the nutriment and flavor is extracted, the proportion of malt and water being substantially two bushels of malt to sixty gallons of water. The liquid extract is strained and evaporated in a vacuum pan at a temperature of 170° Fahrenheit with 25 inches of vacuum, the liquid being brought to a specific gravity of substantially 18° Baumé.

For malting and curing hams and bacon, dried beef, beef trimmings and tongues, pork trimmings and tongues, and all kinds of sausage meats, 100 lbs. of the meat is taken and placed in tierces, barrels or vats, such as the barrels shown in the drawing at 1 and 2. The barrels contain a pickle made up of salt and sodium nitrate, to which is added a portion of the malt extract as prepared above. The proportions of the ingredients forming the pickle are 4 lbs. of salt, 3 ozs. of sodium nitrate, and 8 ozs. of extract for every 100 lbs. of meat, together with sufficient water to bring the pickle to 70° Baumé. The mixture is chilled to 30° Fahrenheit. The meats are allowed to remain in the pickle for a greater or less length of time, depending upon the size of the barrel or tierce, and the quantity of meat treated. In the drawings I have shown the meat 3 in the barrel 1 as being held down in the pickle by means of a false top 4 to keep the meats from floating. After the meats have been kept for a day in the pickle, compressed cold air is forced by means of the compressor 5 through the pipes 6 and through the coil 7 in the bottom of the vat, so as to percolate up through the mixture, agitating the mixture and greatly facilitating the curing process.

When the meats are removed, it will be found that they are mild and of a delicious flavor, due to the malt extract. Furthermore, there is no tendency to harden or toughen the meats, the latter being tender and palatable.

The process of preparing malted products may be applied to dry curing, as well as pickling. To this end a malt powder is prepared by treating the malt in ovens, which brings it into condition so that it can be pulverized or ground. For every 100 lbs. of dry meats 3 ozs. of sodium nitrate, 3½ lbs. of salt, and 12 ozs. of malt powder are used. The salt, sodium nitrate, and malt powder are all mixed together, and are applied to the meat by rubbing on the outer surface. The meats can then be placed in tierces, wooden boxes or wooden racks lined with parchment paper, packed down tight and covered with parchment paper and allowed to remain for 18 to 20 days. It is then ready for consumption or for smoke drying.

For treating poultry, game, fish, vegetables, clam bouillon, beef extracts, bouillon cubes, canned meats, sausage, meat loaves, or delicatessen food products, the malt extract or malt powder may be used by adding from 8 ozs. to 2 lbs. of the powder to 100 lbs. of food products, or from 4 to 12 ozs. of malt extract.

The process disclosed above not only imparts an improved flavor to the foods thus treated, but has a tendency to soften the fiber so that the food may be said to be in a predigested condition.

I claim:

1. The herein described process of preparing meats which consists in treating meats in a pickle, and in simultaneously treating the meats while in the pickle with a malt-containing substance.

2. The herein described process of treating meats which consists in immersing the meats in a pickle containing liquid extract of malt, said pickle being cooled to a temperature of substantially 30° F.

JOHN W. ALLEN.